United States Patent
Kim

(10) Patent No.: US 11,513,550 B1
(45) Date of Patent: Nov. 29, 2022

(54) FOLDABLE PEDAL APPARATUS FOR VEHICLE

(71) Applicants: Hyundai Motor Company, Seoul (KR); Kia Corporation, Seoul (KR)

(72) Inventor: Eun Sik Kim, Gwangmyeon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/490,033

(22) Filed: Sep. 30, 2021

(30) Foreign Application Priority Data

Jun. 1, 2021 (KR) .......................... 10-2021-0071061

(51) Int. Cl.
*G05G 1/40* (2008.04)
*B60T 7/06* (2006.01)
*B60K 26/02* (2006.01)

(52) U.S. Cl.
CPC .............. *G05G 1/40* (2013.01); *B60K 26/02* (2013.01); *B60T 7/06* (2013.01); *B60K 2026/026* (2013.01)

(58) Field of Classification Search
CPC .. G05G 1/30; G05G 1/32; G05G 1/36; G05G 1/38; G05G 1/40; G05G 1/405; G05G 1/42; G05G 1/44; G05G 1/445; G05G 5/03; G05G 5/05; G05G 5/005; G05G 5/28; B60R 21/09; B60T 7/04; B60T 7/06; B60K 26/02; B60K 26/021; B60K 2026/021; B60K 2026/024; B60K 2026/026
See application file for complete search history.

(56) References Cited

U.S. PATENT DOCUMENTS

| | | | | |
|---|---|---|---|---|
| 6,182,525 | B1 * | 2/2001 | Bowers | B60K 23/02 180/274 |
| 6,364,047 | B1 * | 4/2002 | Bortolon | B60K 23/02 74/513 |
| 8,770,616 | B1 * | 7/2014 | Draper | B60N 3/066 297/75 |
| 10,889,226 | B1 * | 1/2021 | Dean | B60T 7/06 |
| 10,906,514 | B1 * | 2/2021 | Kim | G05G 5/03 |
| 10,946,741 | B1 * | 3/2021 | Kim | B60T 7/06 |
| 10,994,611 | B1 * | 5/2021 | Kim | G05G 5/28 |

(Continued)

FOREIGN PATENT DOCUMENTS

| KR | 10-2017-0137427 A | 12/2017 |
|---|---|---|
| WO | WO-2021182563 A1 * | 9/2021 |

OTHER PUBLICATIONS

Machine Translation of WO 2021/182563.*

*Primary Examiner* — Brian J McGovern
(74) *Attorney, Agent, or Firm* — Morgan, Lewis & Bockius LLP

(57) ABSTRACT

A foldable pedal apparatus of a vehicle may have a configuration in which an accelerator pedal assembly and a brake pedal assembly are rotated in a rearward direction from a vehicle body panel and are popped-up to be exposed toward a driver to allow the pedal assemblies to be capable of being controlled when in a situation of manual driving mode, and in which the pedal assemblies are rotated in a frontward direction and are inserted in respective panel grooves of the vehicle body panel so that the pedal assemblies are in a hidden state where exposure thereof toward the driver is blocked to allow the pedal assemblies to be unable to be controlled in a situation of autonomous driving mode where the driver does not directly drive.

17 Claims, 13 Drawing Sheets

(56) References Cited

U.S. PATENT DOCUMENTS

| | | | | |
|---|---|---|---|---|
| 11,021,058 B1* | 6/2021 | Kim | | G05G 5/28 |
| 11,225,226 B1* | 1/2022 | Kim | | B60T 7/065 |
| 11,249,506 B1* | 2/2022 | Kim | | B60T 7/042 |
| 11,312,236 B1* | 4/2022 | Kim | | B60T 7/065 |
| 11,327,520 B1* | 5/2022 | Kim | | G05G 1/40 |
| 2003/0094070 A1* | 5/2003 | O'Neill | | G05G 1/36 |
| | | | | 74/560 |
| 2007/0137397 A1* | 6/2007 | Choi | | G05G 1/36 |
| | | | | 74/512 |
| 2009/0223319 A1* | 9/2009 | Choi | | G05G 1/36 |
| | | | | 74/512 |
| 2011/0132134 A1* | 6/2011 | Kim | | F02D 11/02 |
| | | | | 74/514 |
| 2014/0316648 A1* | 10/2014 | Min | | G05G 1/40 |
| | | | | 701/36 |
| 2015/0053038 A1* | 2/2015 | Kim | | F16H 59/105 |
| | | | | 74/473.3 |
| 2015/0322835 A1* | 11/2015 | Ham | | F01N 3/0814 |
| | | | | 701/29.2 |
| 2017/0225570 A1* | 8/2017 | El Aile | | B60R 7/06 |
| 2019/0310678 A1* | 10/2019 | Wojciechowski | | G05G 1/36 |
| 2020/0257329 A1* | 8/2020 | Kihara | | G05G 1/60 |
| 2020/0262321 A1* | 8/2020 | Masu | | B60N 2/20 |
| 2020/0317152 A1* | 10/2020 | Ghaffari | | B60T 7/042 |
| 2020/0317166 A1* | 10/2020 | Ghaffari | | B60K 26/02 |
| 2020/0317167 A1* | 10/2020 | Ghaffari | | G05D 1/0061 |
| 2020/0398725 A1* | 12/2020 | Mullen | | B60N 3/044 |
| 2021/0004040 A1* | 1/2021 | Dohmen | | G05G 1/42 |
| 2021/0109560 A1* | 4/2021 | Ford | | B60K 20/04 |
| 2021/0170988 A1* | 6/2021 | Villalva Sanchez | | B60R 21/09 |
| 2021/0197083 A1* | 7/2021 | Baumgartner | | A63F 13/803 |
| 2021/0331584 A1* | 10/2021 | Kim | | B60T 7/06 |
| 2021/0394798 A1* | 12/2021 | Kim | | B60T 7/12 |
| 2022/0001843 A1* | 1/2022 | Michael | | G05G 1/60 |
| 2022/0011806 A1* | 1/2022 | Miletto | | B60K 23/02 |
| 2022/0048384 A1* | 2/2022 | Kim | | B60K 26/02 |
| 2022/0055477 A1* | 2/2022 | Kim | | G05G 1/44 |
| 2022/0144222 A1* | 5/2022 | Kim | | B60T 7/06 |
| 2022/0144223 A1* | 5/2022 | Kim | | G05G 1/38 |

* cited by examiner

FOLDABLE PEDAL APPARATUS FOR VEHICLE

CROSS REFERENCE TO RELATED APPLICATION

The present application claims priority to Korean Patent Application No. 10-2021-0071061, filed Jun. 1, 2021, the entire contents of which is incorporated herein for all purposes by this reference.

BACKGROUND OF THE INVENTION

Field of the Invention

The present invention relates to a foldable pedal apparatus for a vehicle. More particularly, the present invention relates to a foldable pedal apparatus for a vehicle, the foldable pedal apparatus including pedal pads configured to protrude from respective pedal housings and to be exposed toward a driver to be controlled by the driver in a manual driving mode where the driver directly drives, and configured to be inserted in the respective pedal housings and thus prevented from being exposed toward the driver to be unable to be controlled by the driver in an autonomous driving situation.

Description of Related Art

An autonomous driving vehicle is a smart vehicle which is grafted with an autonomous driving technology for autonomously reaching a destination without driver's direct control of a steering wheel, an accelerator pedal, a brake, or the like, and recently, has been rapidly developed.

When an autonomous driving situation of the autonomous vehicle is generally realized, the driver is capable of selecting the manual driving mode in which the driver directly drives the vehicle or the autonomous driving mode in which the driver does not directly drive the vehicle and the vehicle autonomously reaches a destination.

When in the autonomous driving mode, since the driver needs to take a rest comfortably by extending his or her legs, there is a disadvantage in that the rest of the driver is interrupted when pedals (an accelerator pedal and a brake pedal) positioned at a lower space of a driver's seat remain exist and being exposed to interior of the vehicle.

Furthermore, the autonomous driving situation is a situation in which the driver does not control the pedals (the accelerator pedal and the brake pedal) of the vehicle, and when the driver controls the pedals during the autonomous driving situation, a vehicle control unit determines that the driver wants to end the autonomous driving and wants to directly drive the vehicle, so that the vehicle control unit ends autonomous driving control.

However, since the pedals of the vehicle are configured to be exposed to the lower space of the driver's seat, there may be a risk in that the driver unconsciously controls the pedals (a situation of misoperating the pedals) during the autonomous driving situation, so that there may be a risk that an accident occurs according to a road situation or a distance between vehicles.

Therefore, there is a need of developing a technology of a pedal apparatus in which a pedal pad is exposed to be protruded toward the driver to be controlled by a driver in the manual driving mode in which the driver directly drives the vehicle, and in which the pedal pad is blocked from being exposed when the vehicle is in the autonomous driving mode to be unable to be controlled by the driver so that the driver can realize a comfortable rest and be prevented from misoperating of the pedals.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a foldable pedal apparatus of a vehicle, in which pedal pads of the foldable pedal apparatus are exposed (pop-up) toward a driver in a manual driving mode by being protruded from respective pedal housings to allow the driver to control pedals, and in which the pedal pads are blocked (hide) from being exposed toward the driver when the vehicle is in an autonomous driving mode by being inserted in the pedal housings to allow the driver to be unable to control the pedals, so that a comfortable rest of the driver may be realized when the vehicle is in an autonomous driving situation, and furthermore, an improvement in a safety may be realized by blocking misoperation of the pedals during the autonomous driving situation.

Various aspects of the present invention are to provide a foldable pedal apparatus of a vehicle that has a configuration in which pop-up amounts (a moving distance of the pedal pads in a rearward direction) of the pedal pads when the pedal pads are changed from a hidden state to a popped-up state may be increased, and by use of the present configuration, the foldable pedal apparatus allows the driver to control the pedal pads more easily and conveniently when a mode of the vehicle is switched from an autonomous driving mode to the manual driving mode.

Various aspects of the present invention are to provide a foldable pedal apparatus configured for a vehicle that has a configuration in which the pop-up amounts of the pedal pads may be increased without using a rail structure, so that a separate installation space for a rail does not require to be secured, and by use of the present configuration, the foldable pedal apparatus can prevent a malfunction of the rail caused by sticking of foreign materials in the rail.

Various aspects of the present invention are to provide a foldable pedal apparatus configured for a vehicle that has a slim shape capable of being easily provided in the vehicle without wasting the internal compartment of the vehicle, and by use of the present configuration, the foldable pedal apparatus can allow a user to broadly utilize the internal compartment of the vehicle.

In various aspects of the present invention, there is provided a foldable pedal apparatus configured for a vehicle, the foldable pedal apparatus including: an accelerator pedal assembly and a brake pedal assembly that are configured to be rotatable in first and second directions, both the accelerator pedal assembly and the brake pedal assembly being configured to be in a hidden state in which exposure thereof toward a driver is blocked when the accelerator pedal assembly and the brake pedal assembly are rotated in the first direction and inserted into respective panel grooves formed at a vehicle body panel, and both the accelerator pedal assembly and the brake pedal assembly being configured to be in a popped-up state in which the accelerator pedal assembly and the brake pedal assembly are exposed toward the driver when the accelerator pedal assembly and the brake pedal assembly are rotated in the second direction and protrude from the respective panel grooves; an accelerator pedal rotary motor fixed on the vehicle body panel, the accelerator pedal rotary motor being connected to the accelerator pedal assembly and configured to supply rotational power to the accelerator pedal assembly when the accelerator pedal rotary motor is operated; and a brake pedal rotary motor fixed on the vehicle body panel, the brake pedal rotary motor being connected to the brake pedal assembly and configured to supply rotational power to the brake pedal assembly when the brake pedal rotary motor is operated.

The vehicle body panel may include: a bottom surface positioned at a lower space of a seat of the driver and extending in the first direction and the second direction; and a front inclined surface extending to the first direction and an upward direction from an end portion of a front side of the bottom surface, wherein the respective panel grooves into which the accelerator pedal assembly and the brake pedal assembly are inserted are formed at the front inclined surface of the vehicle body panel.

Each of the panel grooves may have a configuration including an accelerator pedal insertion groove into which the accelerator pedal assembly is inserted, and a brake pedal insertion groove into which the brake pedal assembly is inserted, and wherein the accelerator pedal insertion groove and the brake pedal insertion groove are spaced from each other in a third and fourth direction thereof, and are configured to extend in an up and down direction thereof.

Each of the panel grooves may be configured to be open in a rearward direction toward the driver from the vehicle body panel, and to be sealed in a first direction thereof, a third direction and a fourth direction thereof, and an up and down direction thereof.

The accelerator pedal rotary motor and the brake pedal rotary motor may be fixed toward a first direction on an external surface of the vehicle body panel, and the accelerator pedal rotary motor and the brake pedal rotary motor are provided with respective motor shafts, wherein the motor shafts are mounted to penetrate through the vehicle body panel and are respectively connected to and integrated with the accelerator pedal assembly and the brake pedal assembly.

The foldable pedal apparatus configured for a vehicle may further include: a protective cover fixed to the vehicle body panel and configured to cover and protect the accelerator pedal rotary motor and the brake pedal rotation motor.

The accelerator pedal assembly may include: an accelerator pedal housing having a lower end portion integrally coupled to a motor shaft of the accelerator pedal rotary motor and configured to be rotated with the motor shaft, the accelerator pedal housing being formed with a guide groove being open to an upward direction thereof; an accelerator pedal pad movably provided by being inserted into the guide groove of the accelerator pedal housing, the accelerator pedal pad being configured to be controlled by the driver; and an accelerator pedal pad return spring inserted in the guide groove of the accelerator pedal housing, the accelerator pedal pad return spring having end portions supported by the accelerator pedal housing and the accelerator pedal pad, supplying a return force to the accelerator pedal pad.

A slot hole which is cut to extend in a longitudinal direction of the accelerator pedal housing may be formed at the accelerator pedal housing, and a pad protrusion inserted in the slot hole may be formed at the accelerator pedal pad, wherein prevention of separation of the accelerator pedal pad and a full stroke of the accelerator pedal pad are determined by a contact between the slot hole and the pad protrusion.

The accelerator pedal assembly may further include: an accelerator pedal permanent magnet coupled to the accelerator pedal pad; and an accelerator pedal printed circuit board (PCB) configured to be fixed to the accelerator pedal housing to face the accelerator pedal permanent magnet, wherein when the accelerator pedal pad is moved, the accelerator pedal PCB detects a movement of the accelerator pedal pad by measuring variation in magnetic flux of the accelerator pedal permanent magnet and generates a signal related to an acceleration.

When the accelerator pedal assembly is in the popped-up state in which the accelerator pedal assembly protrudes from the panel groove, and when in a situation in which the accelerator pedal rotary motor is not operated, at the time when a position of the accelerator pedal permanent magnet is changed as the accelerator pedal pad moves by control of the driver, the accelerator pedal PCB may detect the variation in the magnetic flux of the accelerator pedal permanent magnet and may generate the signal related to the acceleration.

The brake pedal assembly may include: a brake pedal housing having a lower end portion integrally coupled to a motor shaft of the brake pedal rotary motor and configured to be rotated with the motor shaft, and the brake pedal housing being formed with a guide groove being open to an upward direction thereof; a brake pedal pad movably provided by being inserted into the guide groove of the brake pedal housing, the brake pedal pad being configured to be controlled by the driver; and a brake pedal pad return spring inserted in the guide groove of the brake pedal housing, the brake pedal pad return spring having end portions supported by the brake pedal housing and the brake pedal pad, supplying a return force to the brake pedal pad.

A slot hole which is cut to extend in a longitudinal direction of the brake pedal housing may be formed at the brake pedal housing, and a pad protrusion inserted in the slot hole may be formed at the brake pedal pad, wherein prevention of separation of the brake pedal pad and a full stroke of the brake pedal pad are determined by a contact between the slot hole and the pad protrusion.

The brake pedal assembly may further include: a brake pedal permanent magnet coupled to the brake pedal pad; and a brake pedal PCB configured to be fixed to the brake pedal housing to face the brake pedal permanent magnet, wherein when the brake pedal pad is moved, the brake pedal PCB detects a movement of the brake pedal pad by measuring variation in magnetic flux of the brake pedal permanent magnet and generates a signal related to a braking.

When the brake pedal assembly is in the popped-up state in which the brake pedal assembly protrudes from the panel groove, and when in a situation in which the brake pedal rotary motor is not operated, at the time when a position of the brake pedal permanent magnet is changed as the brake pedal pad moves by control of the driver, the brake pedal PCB may detect the variation in the magnetic flux of the brake pedal permanent magnet and may generate the signal related to the braking.

When the accelerator pedal assembly and the brake pedal assembly are rotated in the rearward direction with respect to the vehicle body panel and are protruded from the respective panel grooves, the accelerator pedal assembly and the brake pedal assembly may be in contact with lower end portions of the respective panel grooves, and initial pop-up positions of both the accelerator pedal assembly and the brake pedal assembly may be fixed, and supporting forces for both the accelerator pedal assembly and the brake pedal assembly may be secured.

When the initial pop-up positions of both the accelerator pedal assembly and the brake pedal assembly are fixed by being in contact with the lower end portions of the respective panel grooves, the accelerator pedal rotary motor and the brake pedal rotary motor may be locked, so that binding forces at the initial pop-up positions may be increased.

Pop-up angles of both the accelerator pedal assembly and the brake pedal assembly may be same with each other.

Pop-up angles of both the accelerator pedal assembly and the brake pedal assembly may be different from each other to prevent misoperation of the accelerator pedal assembly and the brake pedal assembly.

According to the foldable pedal apparatus of a vehicle of the present invention, the foldable pedal apparatus has a configuration in which the accelerator pedal assembly and the brake pedal assembly are rotated in the rearward direction and are popped-up to be exposed toward a driver to allow both the accelerator pedal assembly and the brake pedal assembly to be controlled in a manual driving mode, and in which the accelerator pedal assembly and the brake pedal assembly are rotated in the first direction and are inserted into the respective panel grooves of the vehicle body panel so that the two pedal assemblies are in the hidden (concealment) state to prevent both the accelerator pedal assembly and the brake pedal assembly from being controlled by the driver when the vehicle is in an autonomous driving mode where the driver does not directly drive the vehicle, so that the driver can have a comfortable rest in an autonomous driving situation. Furthermore, there is an effect in that an improvement in safety may be realized by blocking misoperation of the pedals during the autonomous driving situation.

Furthermore, according to the foldable pedal apparatus for a vehicle according to various exemplary embodiments of the present invention, the accelerator pedal assembly and the brake pedal assembly in a hidden state are respectively inserted into the accelerator pedal insertion groove and the brake pedal insertion groove that have a slim shape and are formed inside the vehicle and that do not occupy a large amount of space, and the accelerator pedal assembly and the brake pedal assembly are completely hidden, so that an excellent design of the vehicle may be realized, and there is an effect of broadly utilizing the internal compartment of the vehicle.

Furthermore, according to the foldable pedal apparatus for a vehicle according to various exemplary embodiments of the present invention, by the accelerator pedal assembly and the brake pedal assembly both having a configuration in which the accelerator pedal assembly and the brake pedal assembly are respectively protruded from the accelerator pedal insertion groove and the brake pedal insertion groove when the pop-up movement is performed, there is an effect in that a high technological impression of the vehicle may be maximized.

Furthermore, the foldable pedal apparatus for a vehicle according to various exemplary embodiments of the present invention has a configuration in which pop-up amounts of both the accelerator pedal assembly and the brake pedal assembly may be increased by the lengths of both the accelerator pedal assembly and the brake pedal assembly rotated in the rearward direction around the motor shafts when the accelerator pedal assembly and the brake pedal assembly are changed from the hidden state to the popped-up state, thereby allowing the driver to be more easily and conveniently control both the accelerator pedal assembly and the brake pedal assembly when the vehicle is switched from the autonomous driving mode to the manual driving mode.

Furthermore, the foldable pedal apparatus configured for a vehicle according to various exemplary embodiments of the present invention does not use a rail structure, and has a configuration configured for increasing the pop-up amounts of both the accelerator pedal assembly and the brake pedal assembly, so that a separate space to which a rail is provided does not require to be secured, and the present invention has an effect in that a malfunction of a rail caused by sticking of foreign materials may be fundamentally removed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
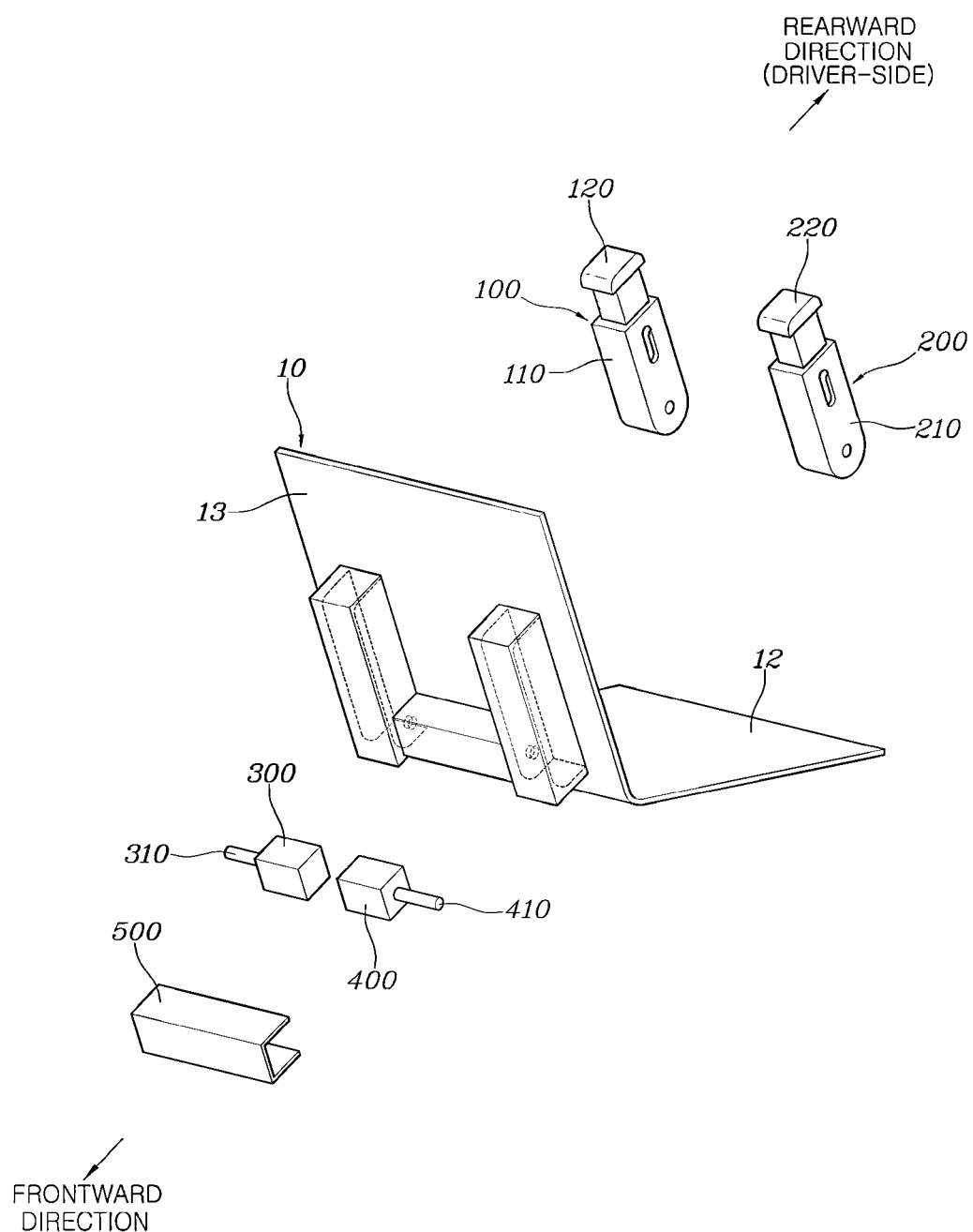
FIG. 1 is an exploded perspective view exemplarily illustrating a foldable pedal apparatus of a vehicle according to various exemplary embodiments of the present invention.
Figure 2:
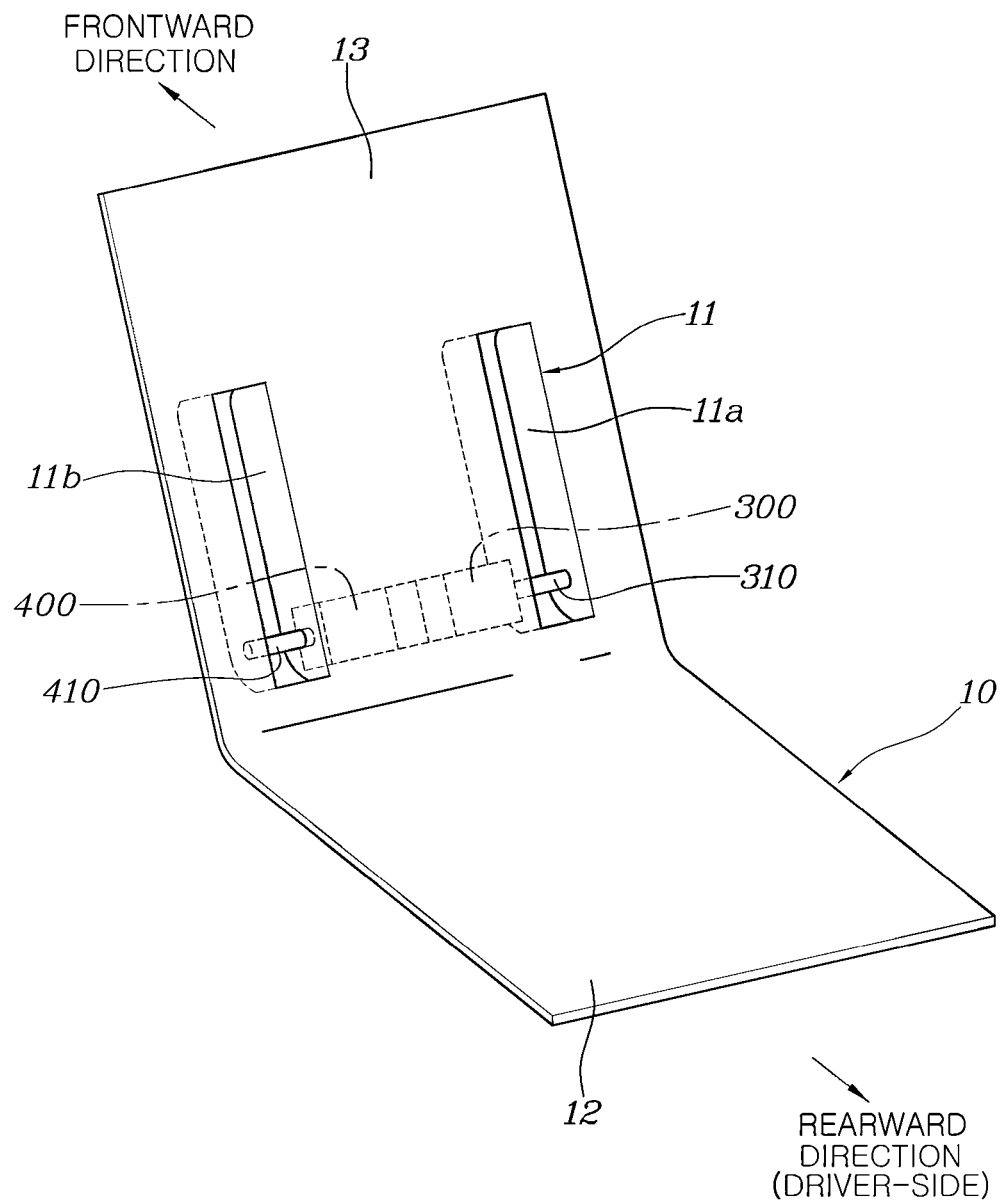
FIG. 2 is a view exemplarily illustrating a vehicle body panel.
Figure 3:
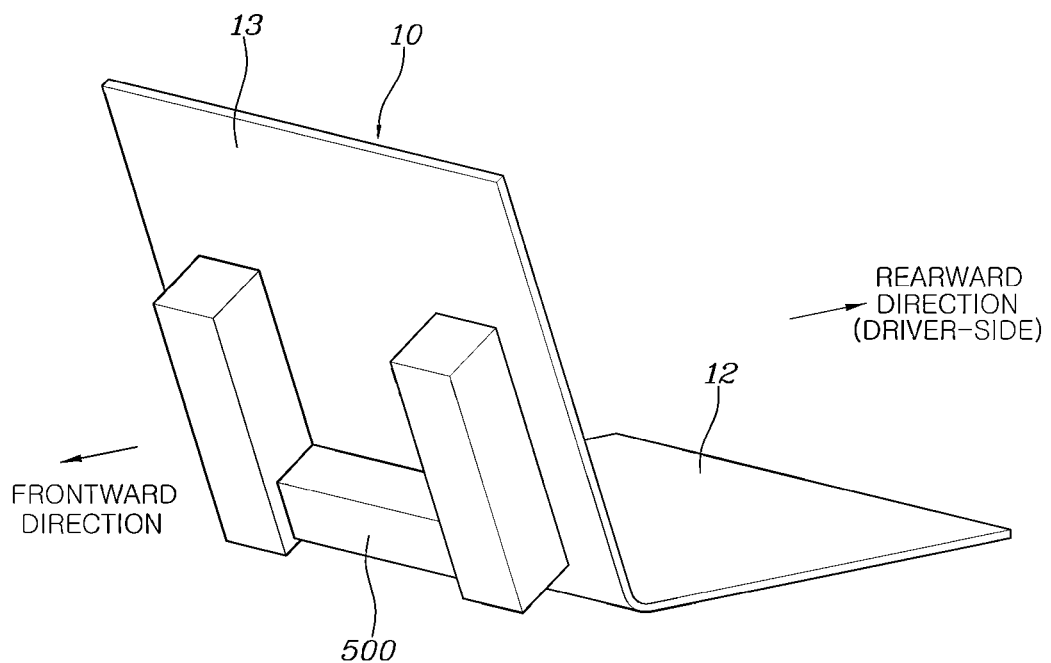
FIG. 3 is a view exemplarily illustrating FIG. 2 when viewed from a frontward direction thereof.
Figure 4:
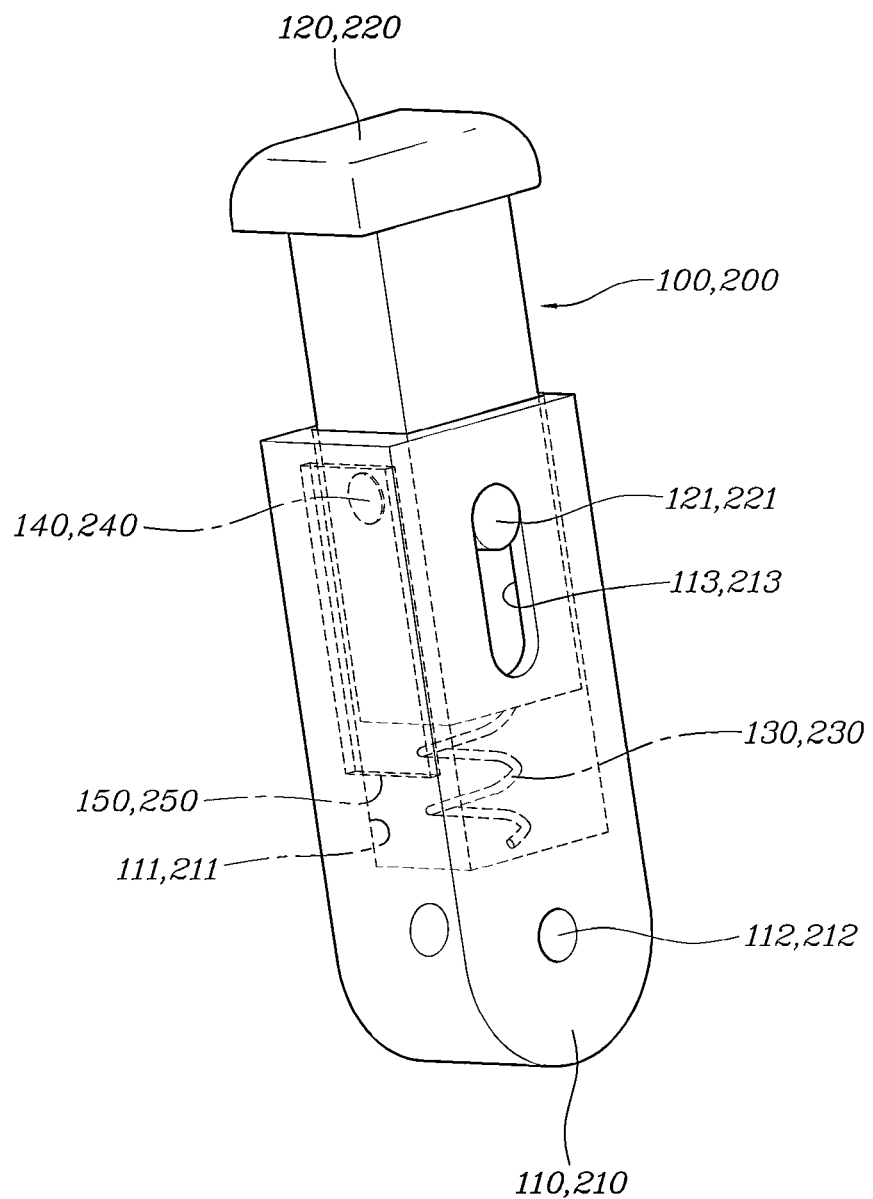
FIG. 4 is a perspective view exemplarily illustrating an accelerator pedal assembly and a brake pedal assembly.
Figure 5:
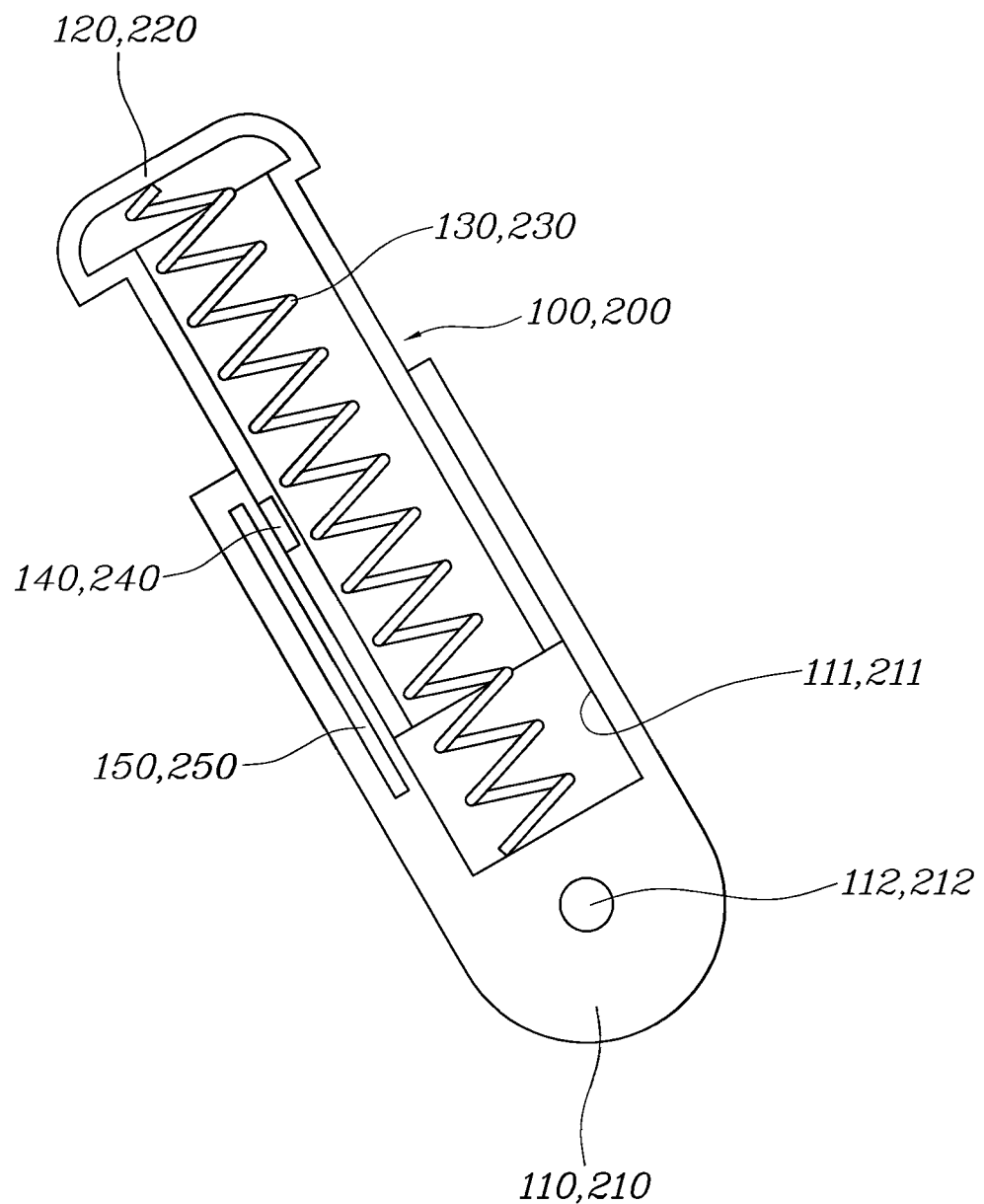
FIG. 5 is a cross-sectional view of FIG. 4.
Figure 6:
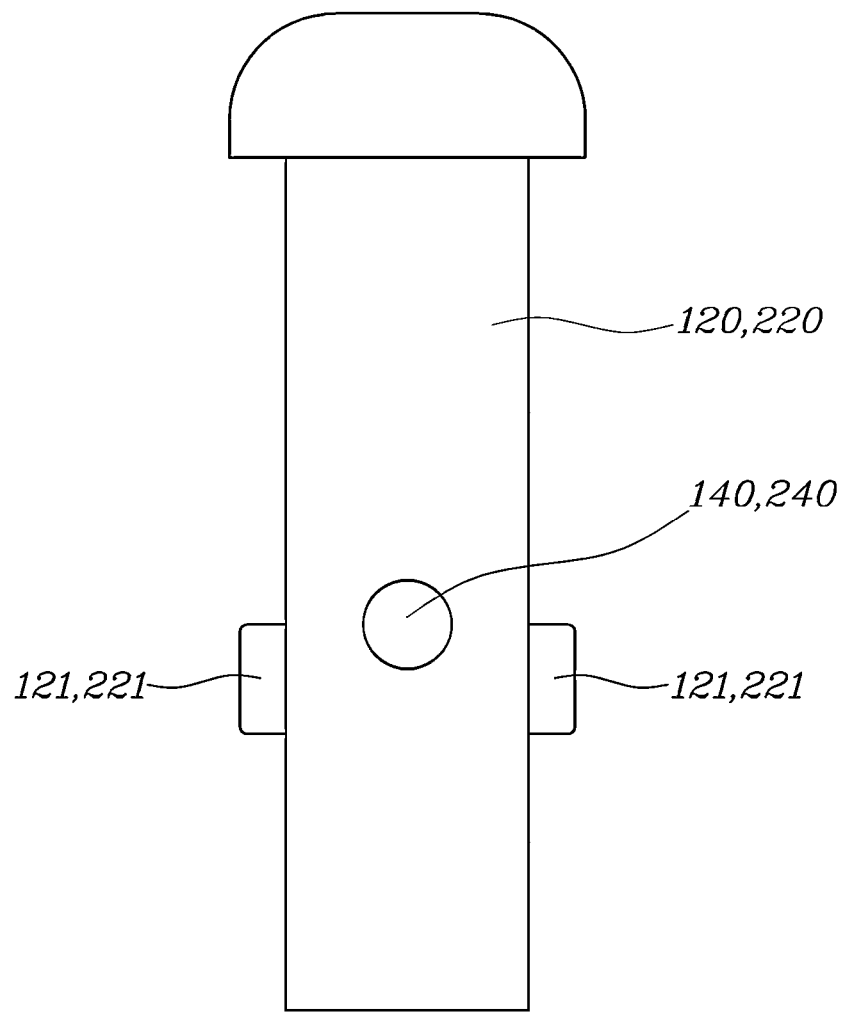
FIG. 6 is a view exemplarily illustrating an accelerator pedal pad and a brake pedal pad.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions of embodiments of the present invention set forth in the description which follows are examples provided to describe the exemplary embodiments of the present invention. However, the present invention may be embodied in many alternative forms and should not be construed as being limited to the exemplary embodiments set forth herein.

The exemplary embodiments of the present invention may be variously modified and changed. Thus, specific embodiments of the present invention are illustrated in the drawings and described in detail in the following description of the exemplary embodiments of the present invention. However, the exemplary embodiments of the present invention are provided only to divulge the present invention and to inform those having ordinary skill in the art of the scope of the present invention.

In the following description of the embodiments, it should be understood that, when the terms "first", "second", etc. are used to describe various elements, these terms are not used to limit the elements. In other words, these terms are used merely to distinguish the same or similar elements. Therefore, a first element may be named a second element and similarly a second element may be named a first element, within the technical scope of the present invention, unless stated otherwise.

In the following description of the embodiments, it should be understood that, when an element is "connected", "coupled", etc. to another element, the two elements may be directly connected or coupled, or one or more other elements may be interposed between the two elements. On the other hand, it should be understood that, when an element is "directly connected to", "directly coupled to", and the like to another element, no elements may be interposed between the two elements. In the following description of the embodiments, other terms expressing relations between elements, such as "between" and "directly between" or "adjacent to" and "directly adjacent to", should be interpreted in the same manner.

It should be understood that terms used in the following description of the exemplary embodiments are used only to describe specific embodiments and are not intended to limit the present invention. A singular expression of an element encompasses a plural expression of the element, unless stated otherwise. In the following description of the embodiments, terms "including", "having", and the like, should be interpreted as indicating presence of characteristics, numbers, steps, operations, elements or portions stated in the specification or combinations thereof, and do not exclude presence of one or more characteristics, numbers, steps, operations, elements, portions or combinations thereof, or a possibility of adding the same.

It should be understood that all terms, including technical or scientific terms, used in the following description of the exemplary embodiments have the same meanings as those which are generally understood by those having ordinary skill in the art, unless defined otherwise. Also, it should be interpreted that terms defined in generally used dictionaries have meanings coinciding with contextual meanings generally, and do not have ideal or excessively formal meanings unless clearly defined.

A controller (a control unit) in accordance with various exemplary embodiments of the present invention may be implemented through a non-volatile memory configured to store data pertaining to an algorithm configured to control operations of various elements or software instructions to implement the algorithm and a processor to perform operations, which are described below, using the data stored in the corresponding memory. In the present example, the memory and the processor may be implemented as separate chips. Alternatively, the memory and the processor may be implemented as a single integrated chip. In the present example, one or more processors may be provided.

Hereinafter, a foldable pedal apparatus of a vehicle according to various exemplary embodiments of the present invention will be described with reference to the accompanying drawings.

As illustrated in FIGS. 1 to 13, the foldable pedal apparatus according to various exemplary embodiments of the present invention may include an accelerator pedal assembly 100 and a brake pedal assembly 200 that are configured to be rotatable in first and second directions, both the accelerator pedal assembly 100 and the brake pedal assembly 200 being configured to be in a hidden state in which exposure thereof toward a driver is blocked when the accelerator pedal assembly 100 and the brake pedal assembly 200 are rotated in the frontward direction and inserted into respective panel grooves 11 formed at a vehicle body panel 10, and both the accelerator pedal assembly 100 and the brake pedal assembly 200 being configured to be in a popped-up state in which the accelerator pedal assembly 100 and the brake pedal assembly 200 are exposed toward the driver when the pedal assemblies 100 and 200 are rotated in the rearward direction and protrude from the respective panel grooves 11; an accelerator pedal rotary motor 300 fixed on the vehicle body panel 10, the accelerator pedal rotary motor 300 being connected to the accelerator pedal assembly 100 and configured to supply rotational power to the accelerator pedal assembly 100 when the accelerator pedal rotary motor 300 is operated; and a brake pedal rotary motor 400 fixed on the vehicle body panel 10, the brake pedal rotary motor 400 being connected to the brake pedal assembly 200 and configured to supply rotational power to the brake pedal assembly 200 when the brake pedal rotary motor 400 is operated.

Figure 7:
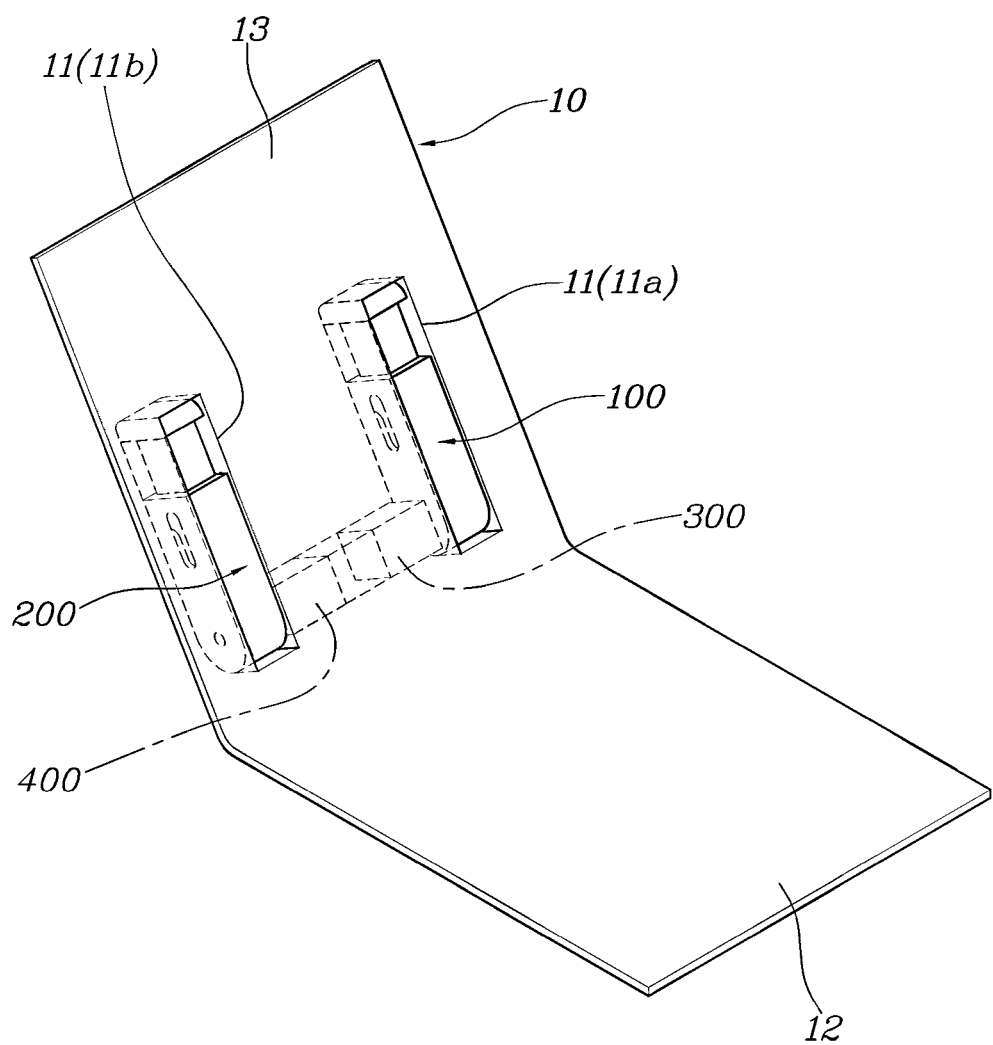
FIG. 7 is a view exemplarily illustrating a state in which the accelerator pedal assembly and the brake pedal assembly are inserted into respective panel grooves of the vehicle body panel.
Figure 8:
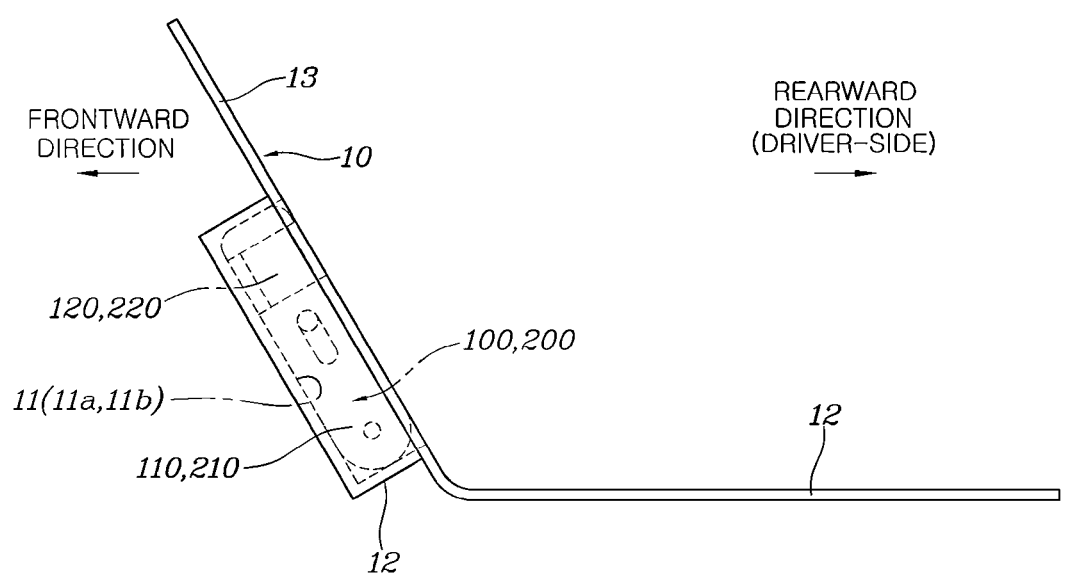
FIG. 8 is a side view of FIG. 7.

According to the foldable pedal apparatus of the present invention, when the accelerator pedal assembly 100 and the brake pedal assembly 200 are rotated in the frontward direction and are inserted into the respective panel grooves 11 of the vehicle body panel 10, the accelerator pedal assembly 100 and the brake pedal assembly 200 maintain the hidden state in which exposure thereof toward the driver is blocked (see FIGS. 7 and 8).

Figure 9:
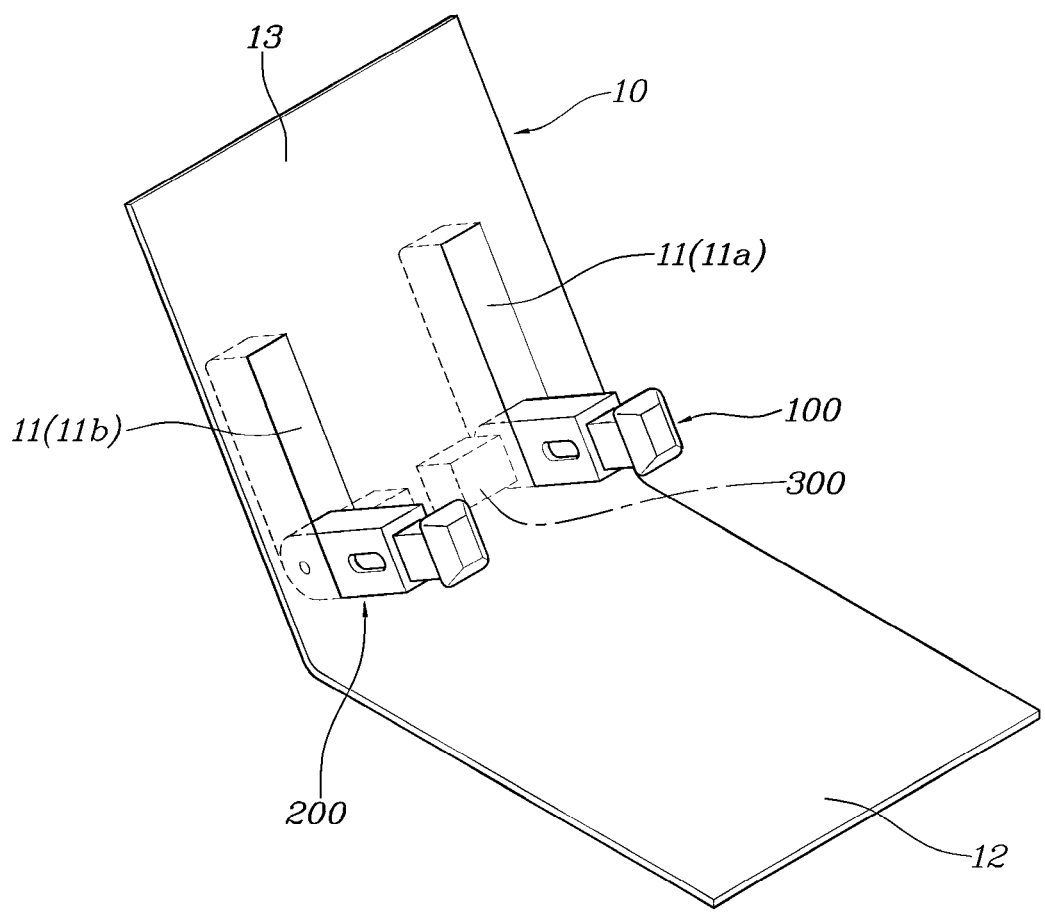
FIG. 9 is a view exemplarily illustrating a popped-up state in which the accelerator pedal assembly and the brake pedal assembly are protruded from inside the respective panel grooves of the vehicle body panel by being rotated in a rearward direction thereof.
Figure 10:
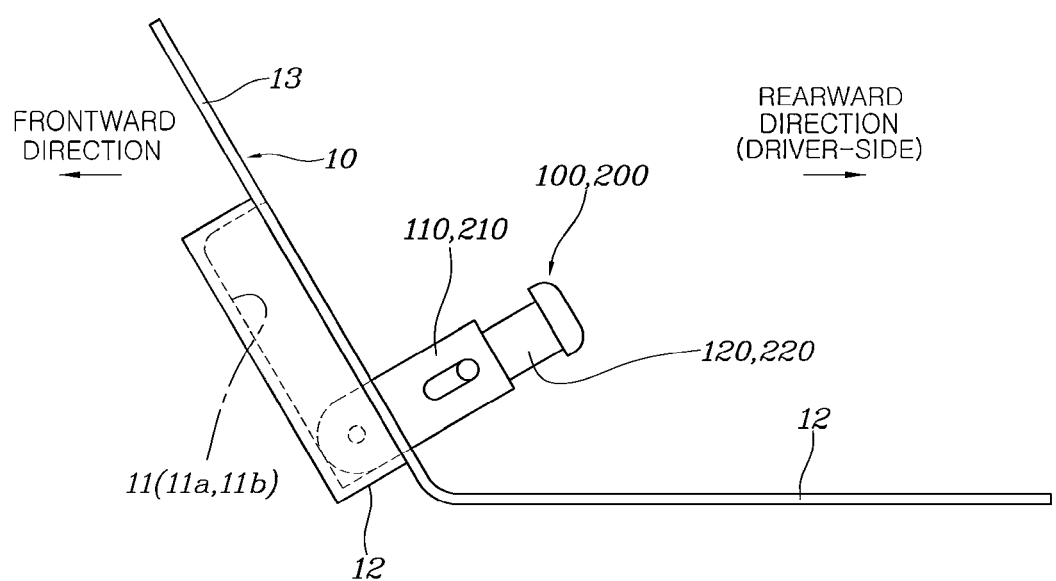
FIG. 10 is a side view of FIG. 9.

Furthermore, according to the foldable pedal apparatus of the present invention, when the accelerator pedal assembly 100 and the brake pedal assembly 200 are rotated in the rearward direction and protrude from the respective panel grooves 11 of the vehicle body panel 10, the accelerator pedal assembly 100 and the brake pedal assembly 200 maintain the popped-up state in which the accelerator pedal assembly 100 and the brake pedal assembly 200 are rotated to realize a predetermined angle with respect to the vehicle body panel 10 and are exposed toward the driver (see FIG. 9 and FIG. 10).

The vehicle body panel 10 includes: a bottom surface 12 which is a foot rest panel positioned at a lower space of a driver's seat and extending in the frontward and the rearward directions; and a front inclined surface 13 extending to the frontward and the upward directions from an end portion of a front side of the bottom surface 12.

According to various exemplary embodiments of the present invention, the respective panel grooves 11 into which the accelerator pedal assembly 100 and the brake pedal assembly 200 are inserted are formed to be positioned at the front inclined surface 13 on the vehicle body panel 10.

The respective panel grooves 11 according to various exemplary embodiments of the present invention have a configuration including an accelerator pedal insertion groove 11a into which the accelerator pedal assembly 100 is inserted and a brake pedal insertion groove 11b into which the brake pedal assembly 200 is inserted. Furthermore, the accelerator pedal insertion groove 11a and the brake pedal insertion groove 11b are spaced from each other in a left and right direction thereof, and are configured to extend in an up and down direction thereof.

Since the accelerator pedal insertion groove 11a and the brake pedal insertion groove 11b are formed to be spaced from each other, when a hide operation in which the accelerator pedal assembly 100 and the brake pedal assembly 200 are respectively inserted into the accelerator pedal insertion groove 11a and the brake pedal insertion groove 11b is performed or when a pop-up operation in which the accelerator pedal assembly 100 and the brake pedal assembly 200 respectively protrude from the accelerator pedal insertion groove 11a and the brake pedal insertion groove 11b is performed, mutual interference between the accelerator pedal assembly 100 and the brake pedal assembly 200 may be prevented, having an advantage of inducing an smooth operation.

The accelerator pedal insertion groove 11a and the brake pedal insertion groove 11b are respectively formed in a rectangular groove shape that extends in a straight line, and the accelerator pedal assembly 100 and the brake pedal assembly 200 are respectively formed in a rectangular shape corresponding to the shape of the accelerator pedal insertion groove 11a and the brake pedal insertion groove 11b.

Therefore, by use of the accelerator pedal insertion groove 11a and the brake pedal insertion groove 11b both having slim shape and formed inside a vehicle and that does not occupy a large amount of space, the accelerator pedal assembly 100 and the brake pedal assembly 200 are configured for being hidden, having an advantage in that internal compartment of the vehicle may be broadly utilized.

Furthermore, in the hidden state in which the accelerator pedal assembly 100 and the brake pedal assembly 200 are respectively inserted into the accelerator pedal insertion groove 11a and the brake pedal insertion groove 11b, the accelerator pedal assembly 100 and the brake pedal assembly 200 are completely hidden by use of the accelerator pedal insertion groove 11a and the brake pedal insertion groove 11b, having an advantage of configured for securing an excellent design.

Furthermore, in the popped-up state in which the accelerator pedal assembly 100 and the brake pedal assembly 200 are respectively protruded from the accelerator pedal insertion groove 11a and the brake pedal insertion groove 11b, there is an advantage in that a high technological impression may be maximized.

Each of the panel grooves 11 according to various exemplary embodiments of the present invention has a configuration in which each of the panel grooves 11 is configured to be open in a rearward direction toward a driver from the vehicle body panel 10, and to be sealed in a frontward direction thereof, a left and right direction thereof, and an up and down direction thereof, so that foreign materials capable of being introduced into each of the panel grooves 11 from the frontward direction based on the vehicle body panel 10 may be blocked. Since a hole that weakens a durability of each of the panel groove 11 may be removed or minimized, improvement of both strength and rigidity thereof may be realized, and there is an advantage in that noise capable of being introduced inside the vehicle may be maximally blocked.

According to various exemplary embodiments of the present invention, the accelerator pedal rotary motor 300 and the brake pedal rotary motor 400 are fixed toward a frontward direction on an external surface of the vehicle body panel 10, and are provided with respective motor shafts 310 and 410. Furthermore, by the motor shafts 310 and 410 penetrated through the vehicle body panel 100, the motor shafts 310 and 410 are respectively connected to and integrated with the accelerator pedal assembly 100 and the brake pedal assembly 200.

As the accelerator pedal rotary motor 300 and the brake pedal rotary motor 400 are fixed toward the frontward direction on the external surface of the vehicle body panel 10, the accelerator pedal rotary motor 300 and the brake pedal rotary motor 400 are prevented from being exposed toward the interior of the vehicle, allowing an external appearance of the vehicle body panel 10 to be improved.

Each of the accelerator pedal rotary motor 300 and the brake pedal rotary motor 400 is a rotation step motor which is configured to rotate during operation and is configured to be stopped from rotating when the operation is stopped, and each of the accelerator pedal rotary motor 300 and the brake pedal rotary motor 400 is configured to be electrically connected to a power supply device.

The motor shaft 310 of the accelerator pedal rotary motor 300 is provided to penetrate through the vehicle body panel 10 and is integrally connected to a lower end portion of the accelerator pedal assembly 100. Accordingly, when the accelerator pedal rotary motor 300 is operated and the motor shaft 310 is rotated, the accelerator pedal assembly 100 is in the popped-up state in which an upper end portion of the accelerator pedal assembly 100 is rotated in the rearward direction around the lower end portion thereof which is connected to the motor shaft 310 so that the accelerator pedal assembly 100 protrudes from the accelerator pedal insertion groove 11a.

The accelerator pedal assembly 100 has a configuration in which a pop-up amount of the accelerator pedal assembly 100 is configured for being increased as a length rotated in the rearward direction around the motor shaft 310 when the accelerator pedal assembly 100 is being changed from the hidden state to the popped-up state, allowing the driver to be more easily and conveniently control the accelerator pedal assembly 100 when the vehicle is switched from an autonomous driving mode to a manual driving mode.

In the same manner as the accelerator pedal assembly 100 has, the brake pedal assembly 200 also has a pop-up configuration in which an upper end portion of the brake pedal assembly 200 is rotated in the rearward direction around the motor shaft 410 of the brake pedal rotary motor 400 which is coupled to a lower end portion of the brake pedal assembly 200, being configured for increasing the pop-up amount.

Furthermore, the present invention does not use a rail structure, and has a configuration capable of increasing the pop-up amounts of both the accelerator pedal assembly 100 and the brake pedal assembly 200, so that a separate space to which a rail is provided does not require to be secured, and a malfunction of a rail caused by sticking of foreign materials may be removed.

In various exemplary embodiments of the present invention, a protective cover 500 fixed to the vehicle body panel 10 and configured to cover and protect both the accelerator pedal rotary motor 300 and the brake pedal rotary motor 400 is further included.

The accelerator pedal assembly 100 according to various exemplary embodiments of the present invention may include an accelerator pedal housing 110 having a lower end portion integrally coupled to the motor shaft 310 of the accelerator pedal rotary motor 300 and configured to be rotated with the motor shaft 310, the accelerator pedal housing 110 being formed with a guide groove 111 being open to an upward direction thereof; an accelerator pedal pad 120 movably provided by being inserted into the guide groove 111 of the accelerator pedal housing 110, the accelerator pedal pad 120 being configured to be controlled by a driver; and an accelerator pedal pad return spring 130 inserted into the guide groove 111, the accelerator pedal pad return spring 130 having opposite end portions supported by the accelerator pedal housing 110 and the accelerator pedal pad 120, supplying a return force to the accelerator pedal pad 120.

A shaft hole 112 to couple the motor shaft 310 is formed at the lower end portion of the accelerator pedal housing 110.

A lower end portion of the accelerator pedal pad 120 is inserted into the guide groove 111 and moves along the guide groove 111, and an upper end portion of the accelerator pedal pad 120 protrudes to an upward of the accelerator pedal housing 110 and is controlled by a driver's foot.

When the accelerator pedal pad 120 has a movement of being inserted in the accelerator pedal housing 110 along the guide groove 111 by control of a driver, the accelerator pedal pad return spring 130 is compressed, and when a control force of the driver is released from the accelerator pedal pad 120, the accelerator pedal pad return spring 130 is restored. At the instant time, the accelerator pedal pad 120 protrudes from the accelerator pedal housing 110 and is returned to an initial position.

A slot hole 112 which is cut to extend in a longitudinal direction of the accelerator pedal housing 110 is formed at the accelerator pedal housing 110, and a pad protrusion 121 inserted in the slot hole 113 is formed at the accelerator pedal pad 120.

When the accelerator pedal pad 120 is moved along the guide groove 111 of the accelerator pedal housing 110, the slot hole 113 and the pad protrusion 121 are in contact with each other, and prevention of separation of the accelerator pedal pad 120 and a full stroke of the accelerator pedal pad 120 are determined by a contact between the slot hole 113 and the pad protrusion 121.

The accelerator pedal assembly 100 according to various exemplary embodiments of the present invention may further include an accelerator pedal permanent magnet 140 coupled to the accelerator pedal pad 120; and an accelerator pedal printed circuit board (PCB) 150 configured to be fixed to the accelerator pedal housing 110 to face the accelerator pedal permanent magnet 140.

When the accelerator pedal pad 120 is moved along the guide groove 111 of the accelerator pedal housing 110 by control of the driver, the accelerator pedal PCB 150 detects a movement of the accelerator pedal pad 120 by measuring variation in magnetic flux of the accelerator pedal permanent magnet 140 and generates a signal related to an acceleration.

Figure 11:
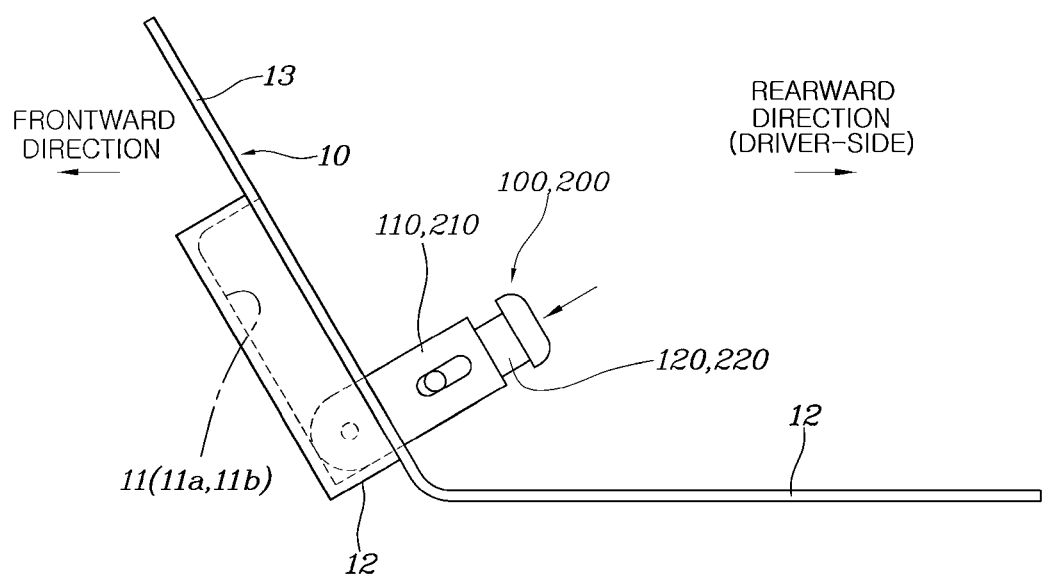
FIG. 11 is a view exemplarily illustrating a state in which the accelerator pedal pad and the brake pedal pad in FIG. 10 are moved and inserted in an accelerator pedal housing and a brake pedal housing, respectively, as a driver controls the accelerator pedal pad and the brake pedal pad.
Figure 12:
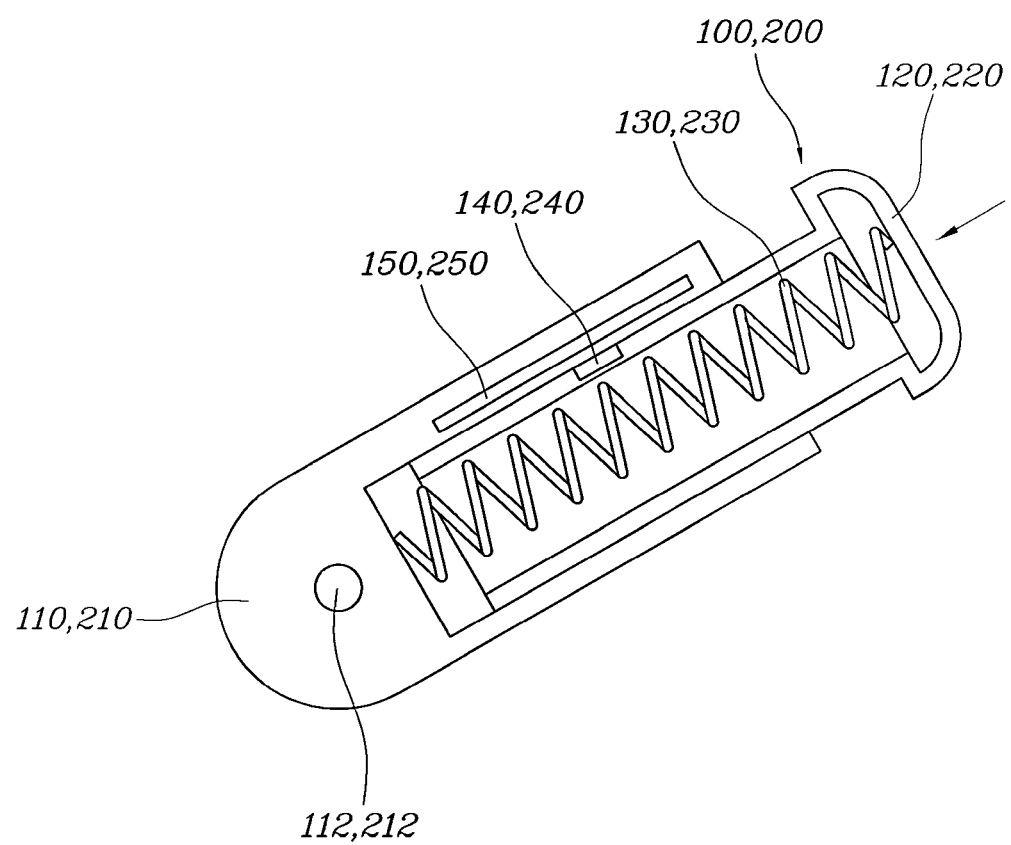
FIG. 12 is a cross-sectional view exemplarily illustrating the accelerator pedal assembly and the brake pedal assembly in FIG. 11.
Figure 13:
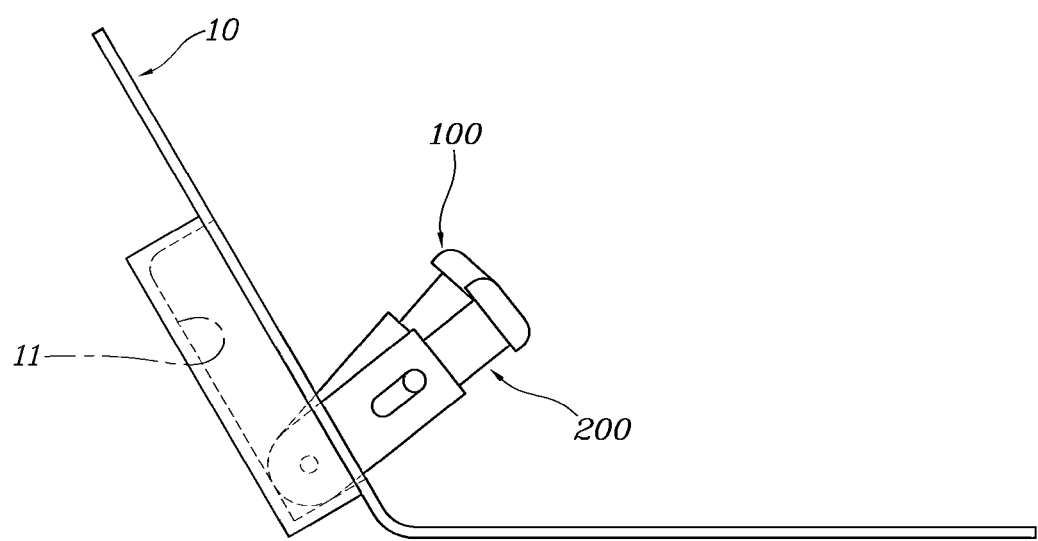
FIG. 13 is a view for describing a state in which pop-up angles of both the accelerator pedal assembly and the brake pedal assembly are different from each other.

In other words, as illustrated in FIG. 11 and FIG. 12, when the accelerator pedal assembly 100 is in the popped-up state in which the accelerator pedal assembly 100 protrudes from the panel groove 11, and when in a situation in which the accelerator pedal rotary motor 300 is not operated, at the time when a position of the accelerator pedal permanent magnet 140 is changed as the accelerator pedal pad 12 moves by control of the driver, the accelerator pedal PCB 150 detects a variation in magnetic flux of the accelerator pedal permanent magnet 140 and generates the signal related to the acceleration.

The brake pedal assembly 200 according to various exemplary embodiments of the present invention may include a brake pedal housing 210 having a lower end portion integrally coupled to the motor shaft 410 of the brake pedal rotary motor 400 and configured to be rotated with the motor shaft 410, and the brake pedal housing 210 being formed with a guide groove 211 being open to an upward direction thereof; a brake pedal pad 220 movably provided by being inserted into the guide groove 211 of the brake pedal housing 210, the brake pedal pad 220 being configured to be controlled by a driver; and a brake pedal pad return spring 230 inserted in the guide groove 211, the brake pedal pad return spring 230 having opposite end portions supported by the brake pedal housing 210 and the brake pedal pad 220, supplying a return force to the brake pedal pad 220.

A shaft hole 212 to couple the motor shaft 410 is formed at the lower end portion of the brake pedal housing 210.

The lower end portion of the brake pedal pad 220 is inserted into the guide groove 211 and moves along the guide groove 211, and an upper end portion of the brake pedal pad 220 protrudes to an upward from the brake pedal housing 210 and is controlled by a driver's foot.

When the brake pedal pad 220 has a movement of being inserted in the brake pedal housing 210 along the guide groove 211 by a control of a driver, the brake pedal pad return spring 230 is compressed, and when a control force of the driver is released from the brake pedal pad 220, the brake pedal pad return spring 230 is restored. At the instant time, the brake pedal pad 220 protrudes from the brake pedal housing 210 and is returned to an initial position.

A slot hole 213 which is cut to extend in a longitudinal direction of the brake pedal housing 210 is formed at the brake pedal housing 210, and a pad protrusion 221 inserted in the slot hole 213 is formed at the brake pedal pad 220.

When the brake pedal pad 220 is moved along the guide groove 211 of the brake pedal housing 210, the slot hole 213 and the pad protrusion 221 are in contact with each other, and prevention of separation of the brake pedal pad 220 and a full stroke of the brake pedal pad 220 are determined by a contact between the slot hole 213 and the pad protrusion 221.

The brake pedal assembly 200 according to various exemplary embodiments of the present invention may further include a brake pedal permanent magnet 240 coupled to the brake pedal pad 220; and a brake pedal PCB 250 configured to be fixed to the brake pedal housing 210 to face the brake pedal permanent magnet 240.

When the brake pedal pad 220 is moved along the guide groove 211 of the brake pedal housing 210 by control of the driver, the brake pedal PCB 250 detects a movement of the brake pedal pad 220 by measuring variation in magnetic flux of the brake pedal permanent magnet 240 and generates a signal related to a brake.

In other words, as illustrated in FIG. 11 and FIG. 12, when the brake pedal assembly 200 is in the popped-up state in which the brake pedal assembly 200 protrudes from the panel groove 11, and when in a situation in which the brake pedal rotary motor 400 is not operated, at the time when a position of the brake pedal permanent magnet 240 is changed as the brake pedal pad 220 moves by control of the driver, the brake pedal PCB 250 detects a variation in magnetic flux of the brake pedal permanent magnet 240 and generates the signal related to the brake.

In various exemplary embodiments of the present invention, as illustrated in FIG. 9 and FIG. 10, when the accelerator pedal assembly 100 and the brake pedal assembly 200 are rotated in the rearward direction with respect to the vehicle body panel 10 and are protruded from the respective panel grooves 11, the accelerator pedal assembly 100 and the brake pedal assembly 200 are in contact with lower end portions of the respective panel groove 11, and initial pop-up positions of both the accelerator pedal assembly 100 and the brake pedal assembly 200 are fixed at the present time, and supporting forces for both the accelerator pedal assembly 100 and the brake pedal assembly 200 are secured.

Furthermore, when the initial pop-up positions of both the accelerator pedal assembly 100 and the brake pedal assembly 200 are fixed by being in contact with the lower end portions of the respective panel grooves 11, the accelerator pedal rotary motor 300 and the brake pedal rotary motor 400 are locked, so that binding forces at the initial pop-up positions may be further increased.

That is, fixation of the initial pop-up positions of both the accelerator pedal assembly 100 and the brake pedal assembly 200 may be realized by being in contact with the lower end portions of the respective panel grooves 11, or may be realized by locking of the accelerator pedal rotary motor 300 and by locking of the brake pedal rotary motor 400, or may be realized such that the contact with the lower end portions of the respective panel grooves 11 and the locking of both the accelerator pedal rotary motor 300 and the brake pedal rotary motor 400 are all executed.

As illustrated in FIG. 9 and FIG. 10, according to various exemplary embodiments of the present invention, pop-up angles of both the accelerator pedal assembly 100 and the brake pedal assembly 200 are same with each other, allowing an external appearance to be improved. As an another example illustrated in FIG. 13, pop-up angles of both the accelerator pedal assembly 100 and the brake pedal assembly 200 are different from each other, so that there is an advantage in that misoperation may be prevented.

In FIGS. 7 and 8, the hidden state in which the accelerator pedal assembly 100 and the brake pedal assembly 200 are respectively inserted in the accelerator pedal insertion groove 11a and the brake pedal insertion groove 11b that are formed at the vehicle body panel 10 so that exposure thereof toward a driver is blocked is illustrated.

When in the hidden state, the accelerator pedal assembly 100 and the brake pedal assembly 200 are respectively inserted in the accelerator pedal insertion groove 11a and the brake pedal insertion groove 11b that have a slim shape and formed inside the vehicle and that does not occupy a large amount of a space, having an advantage of broadly utilizing internal compartment of the vehicle.

Furthermore, when in the hidden state, the accelerator pedal assembly 100 and the brake pedal assembly 200 are completely hidden by use of a configuration of both the accelerator pedal insertion groove 11a and the brake pedal insertion groove 11b, having an advantage of capable of realizing an excellent design.

When the accelerator pedal assembly 100 and the brake pedal assembly 200 are in the hidden (concealment) state, as a lower space of a driver's seat becomes a wide space at which an interference of pedals does not exist, the driver is capable of having a comfortable rest in a relax mode, and also misoperation of the pedals in an autonomous driving situation is prevented, so that an improvement in a safety may be realized.

In FIG. 9 and FIG. 10, by operation of both the accelerator pedal rotary motor 300 and the brake pedal rotary motor 400, the accelerator pedal assembly 100 and the brake pedal assembly 200 are rotated in the rearward direction and are protruded from the accelerator pedal insertion groove 11a and the brake pedal insertion groove 11b, so that the accelerator pedal assembly 100 and the brake pedal assembly 200 are in the popped-up state in which the accelerator pedal assembly 100 and the brake pedal assembly 200 are exposed toward the driver.

By the accelerator pedal assembly 100 and the brake pedal assembly 200 both having a configuration in which the accelerator pedal assembly 100 and the brake pedal assembly 200 are respectively protruded from the accelerator pedal insertion groove 11a and the brake pedal insertion groove 11b when the pop-up movement is performed, there is an advantage in that a high technological impression may be maximized.

The foldable pedal apparatus according to various exemplary embodiments of the present invention has a configuration in which pop-up amounts of both the accelerator pedal assembly 100 and the brake pedal assembly are configured for being increased as a length rotated in the rearward direction around the motor shafts 310 and 410 when the accelerator pedal assembly 100 and the brake pedal assembly 200 are changed from the hidden state to the popped-up state, allowing the driver to more easily and conveniently control both the accelerator pedal assembly 100 and the brake pedal assembly 200 when the vehicle is switched from an autonomous driving mode to a manual driving mode.

Furthermore, the present invention does not use a rail structure, and has a configuration capable of increasing the pop-up amounts of both the accelerator pedal assembly 100 and the brake pedal assembly 200, so that a separate space to which a rail is provided does not require to be secured, and the present invention has an advantage in that a malfunction of a rail caused by sticking of foreign materials may be removed.

As described above, when the accelerator pedal assembly 100 and the brake pedal assembly 200 are in the popped-up state in which the accelerator pedal assembly 100 and the brake pedal assembly 200 are rotated in the rearward direction and are protruded, a driver controls the accelerator pedal assembly 100 and the brake pedal assembly 200 with his or her foot and a normal operation is performed.

FIG. 11 and FIG. 12 are illustrating a situation in which a driver operates the accelerator pedal assembly 100 and the brake pedal assembly 200 with his or her foot.

When the accelerator pedal pad 120 is moved along the guide groove 111 of the accelerator pedal housing 110 by control of the driver, the accelerator pedal PCB 150 detects a movement of the accelerator pedal pad 120 by measuring variation in magnetic flux of the accelerator pedal permanent magnet 140 and generates a signal related to an acceleration.

Furthermore, when the brake pedal pad 220 is moved along the guide groove 211 of the brake pedal housing 210 by control of the driver, the brake pedal PCB 250 detects a movement of the brake pedal pad 220 by measuring variation in magnetic flux of the brake pedal permanent magnet 240 and generates a signal related to a brake.

As described above, the foldable pedal apparatus according to various exemplary embodiments of the present invention has a configuration in which the accelerator pedal assembly 100 and the brake pedal assembly 200 are rotated in the rearward direction and are popped-up to be exposed toward a driver to allow both the accelerator pedal assembly 100 and the brake pedal assembly 200 to be controlled in a manual driving mode, and in which the accelerator pedal assembly 100 and the brake pedal assembly 200 are rotated in the frontward direction and are inserted into the respective panel grooves 11 of the vehicle body panel 10 so that the two pedal assemblies 100 and 200 are in the hidden (concealment) state to prevent both the accelerator pedal assembly 100 and the brake pedal assembly 200 from being controlled by the driver when the vehicle is in an autonomous driving mode where the driver does not directly drive the vehicle, so that the driver can have a comfortable rest in an autonomous driving situation. Furthermore, there is an advantage in that an improvement in safety may be realized by blocking misoperation of the pedals during the autonomous driving situation.

Furthermore, according to the foldable pedal apparatus of a vehicle according to various exemplary embodiments of the present invention, the accelerator pedal assembly 100 and the brake pedal assembly 200 in a hidden state are respectively inserted into the accelerator pedal insertion groove 11a and the brake pedal insertion groove 11b that have a slim shape and are formed inside the vehicle and that do not occupy a large amount of space, and the accelerator pedal assembly 100 and the brake pedal assembly 200 are completely hidden, so that an excellent design of the vehicle may be realized, and there is an advantage of broadly utilizing the internal compartment of the vehicle.

Furthermore, according to the foldable pedal apparatus of a vehicle according to various exemplary embodiments of the present invention, by the accelerator pedal assembly 100 and the brake pedal assembly 200 both having a configuration in which the accelerator pedal assembly 100 and the brake pedal assembly 200 are respectively protruded from the accelerator pedal insertion groove 11a and the brake pedal insertion groove 11b when the pop-up movement is performed, there is an advantage in that a high technological impression of the vehicle may be maximized.

Furthermore, the foldable pedal apparatus according to various exemplary embodiments of the present invention has a configuration in which pop-up amounts of both the accelerator pedal assembly 100 and the brake pedal assembly 200 may be increased by the lengths of both the accelerator pedal assembly 100 and the brake pedal assembly 200 rotated in the rearward direction around the motor shafts 310 and 410 when the accelerator pedal assembly 100 and the brake pedal assembly 200 are changed from the hidden state to the popped-up state, allowing the driver to be more easily and conveniently control both the accelerator pedal assembly 100 and the brake pedal assembly 200 when the vehicle is switched from the autonomous driving mode to the manual driving mode.

Furthermore, the foldable pedal apparatus of a vehicle according to various exemplary embodiments of the present invention does not use a rail structure, and has a configuration capable of increasing the pop-up amounts of both the accelerator pedal assembly 100 and the brake pedal assembly 200, so that a separate space to which a rail is provided does not require to be secured, and the present invention has an advantage in that a malfunction of a rail caused by sticking of foreign materials may be removed.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A foldable pedal apparatus for a vehicle, the apparatus comprising:
    an accelerator pedal assembly and a brake pedal assembly that are configured to be rotatable in first and second directions,
        wherein the accelerator pedal assembly and the brake pedal assembly are configured to be in a hidden state in which exposure thereof toward a driver is blocked when the accelerator pedal assembly and the brake pedal assembly are rotated in the first direction and inserted into respective panel grooves formed at a vehicle body panel, and
        wherein the accelerator pedal assembly and the brake pedal assembly are configured to be in a popped-up state in which the accelerator pedal assembly and the brake pedal assembly are exposed toward the driver when the accelerator pedal assembly and the brake pedal assembly are rotated in the second direction and protrude from the respective panel grooves;
    an accelerator pedal rotary motor fixed on the vehicle body panel, the accelerator pedal rotary motor being connected to the accelerator pedal assembly and configured to supply rotational power to the accelerator pedal assembly when the accelerator pedal rotary motor is operated; and
    a brake pedal rotary motor fixed on the vehicle body panel, the brake pedal rotary motor being connected to the brake pedal assembly and configured to supply rotational power to the brake pedal assembly when the brake pedal rotary motor is operated,
    wherein each of the respective panel grooves is open in the second direction toward the driver from the vehicle body panel, and closed in the first direction, a third direction and a fourth direction, and an up and a down direction.

2. The apparatus of claim 1, wherein the vehicle body panel includes:
   a bottom surface positioned at a lower space of a seat of the driver; and
   a front inclined surface extending in the first direction and the up direction from an end portion of a front side of the bottom surface,
   wherein the respective panel grooves into which the accelerator pedal assembly and the brake pedal assembly are inserted are formed at the front inclined surface of the vehicle body panel.

3. The apparatus of claim 1, wherein each of the respective panel grooves has a configuration including an accelerator pedal insertion groove into which the accelerator pedal assembly is inserted, and a brake pedal insertion groove into which the brake pedal assembly is inserted, and
   wherein the accelerator pedal insertion groove and the brake pedal insertion groove are spaced from each other, and are configured to extend in the up and down directions.

4. The apparatus of claim 1,
   wherein the accelerator pedal rotary motor and the brake pedal rotary motor are fixed toward the first direction on an external surface of the vehicle body panel, and the accelerator pedal rotary motor and the brake pedal rotary motor are disposed with respective motor shafts, and
   wherein the respective motor shafts are mounted to penetrate through the vehicle body panel and are respectively connected to and integrated with the accelerator pedal assembly and the brake pedal assembly.

5. The apparatus of claim 1, wherein the accelerator pedal assembly includes:
   an accelerator pedal housing having a lower end portion integrally coupled to a motor shaft of the accelerator pedal rotary motor and configured to be rotated with the motor shaft, the accelerator pedal housing being formed with a guide groove being open in a longitudinal direction thereof;
   an accelerator pedal pad movably provided by being inserted into the guide groove of the accelerator pedal housing, the accelerator pedal pad being configured to be controlled by the driver; and
   an accelerator pedal pad return spring inserted in the guide groove of the accelerator pedal housing, the accelerator pedal pad return spring having end portions supported by the accelerator pedal housing and the accelerator pedal pad, supplying a return force to the accelerator pedal pad.

6. The apparatus of claim 5,
   wherein a slot hole which is cut to extend in the longitudinal direction of the accelerator pedal housing is formed at the accelerator pedal housing, and a pad protrusion inserted in the slot hole is formed at the accelerator pedal pad,
   wherein prevention of separation of the accelerator pedal pad and a full stroke of the accelerator pedal pad are determined by a contact between the slot hole and the pad protrusion.

7. The apparatus of claim 5, wherein the accelerator pedal assembly further includes:
   an accelerator pedal permanent magnet coupled to the accelerator pedal pad; and
   an accelerator pedal printed circuit board (PCB) provided to be fixed to the accelerator pedal housing to face the accelerator pedal permanent magnet,
   wherein when the accelerator pedal pad is moved, the accelerator pedal PCB detects a movement of the accelerator pedal pad by measuring variation in magnetic flux of the accelerator pedal permanent magnet and generates a signal related to an acceleration.

8. The apparatus of claim 7, wherein when the accelerator pedal assembly is in the popped-up state in which the accelerator pedal assembly protrudes from the respective panel groove, and when in a situation in which the accelerator pedal rotary motor is not operated, at a time when a position of the accelerator pedal permanent magnet is changed as the accelerator pedal pad moves by control of the driver, the accelerator pedal PCB detects the variation in the magnetic flux of the accelerator pedal permanent magnet and generates the signal related to the acceleration.

9. The apparatus of claim 1, wherein the brake pedal assembly includes:
   a brake pedal housing having a lower end portion integrally coupled to a motor shaft of the brake pedal rotary motor and configured to be rotated with the motor shaft, and the brake pedal housing being formed with a guide groove being open in a longitudinal direction thereof;
   a brake pedal pad movably provided by being inserted into the guide groove of the brake pedal housing, the brake pedal pad being configured to be controlled by the driver; and
   a brake pedal pad return spring inserted in the guide groove of the brake pedal housing, the brake pedal pad return spring having end portions supported by the brake pedal housing and the brake pedal pad, supplying a return force to the brake pedal pad.

10. The apparatus of claim 9,
    wherein a slot hole which is cut to extend in the longitudinal direction of the brake pedal housing is formed at the brake pedal housing, and a pad protrusion inserted in the slot hole is formed at the brake pedal pad, and
    wherein prevention of separation of the brake pedal pad and a full stroke of the brake pedal pad are determined by a contact between the slot hole and the pad protrusion.

11. The apparatus of claim 9, wherein the brake pedal assembly further includes:
    a brake pedal permanent magnet coupled to the brake pedal pad; and
    a brake pedal printed circuit board (PCB) provided to be fixed to the brake pedal housing to face the brake pedal permanent magnet,
    wherein when the brake pedal pad is moved, the brake pedal PCB detects a movement of the brake pedal pad by measuring variation in magnetic flux of the brake pedal permanent magnet and generates a signal related to a braking.

12. The apparatus of claim 11, wherein when the brake pedal assembly is in the popped-up state in which the brake pedal assembly protrudes from the respective panel groove, and when in a situation in which the brake pedal rotary motor is not operated, at a time when a position of the brake pedal permanent magnet is changed as the brake pedal pad moves by control of the driver, the brake pedal PCB detects the variation in the magnetic flux of the brake pedal permanent magnet and generates the signal related to the braking.

13. The apparatus of claim 1, wherein when the accelerator pedal assembly and the brake pedal assembly are rotated in the second direction with respect to the vehicle body panel and are protruded from the respective panel grooves, the accelerator pedal assembly and the brake pedal assembly are in contact with lower end portions of the respective panel grooves, and initial pop-up positions of the accelerator pedal assembly and the brake pedal assembly are fixed, and supporting forces for the accelerator pedal assembly and the brake pedal assembly are secured.

14. The apparatus of claim 13, wherein when the initial pop-up positions of the accelerator pedal assembly and the brake pedal assembly are fixed by being in contact with the lower end portions of the respective panel grooves, the accelerator pedal rotary motor and the brake pedal rotary motor are locked, so that binding forces at the initial pop-up positions are increased.

15. The apparatus of claim 1, wherein pop-up angles of the accelerator pedal assembly and the brake pedal assembly are the same with each other.

16. A foldable pedal apparatus for a vehicle, the apparatus comprising:
- an accelerator pedal assembly and a brake pedal assembly that are configured to be rotatable in first and second directions,
  - wherein the accelerator pedal assembly and the brake pedal assembly are configured to be in a hidden state in which exposure thereof toward a driver is blocked when the accelerator pedal assembly and the brake pedal assembly are rotated in the first direction and inserted into respective panel grooves formed at a vehicle body panel, and
  - wherein the accelerator pedal assembly and the brake pedal assembly are configured to be in a popped-up state in which the accelerator pedal assembly and the brake pedal assembly are exposed toward the driver when the accelerator pedal assembly and the brake pedal assembly are rotated in the second direction and protrude from the respective panel grooves;
- an accelerator pedal rotary motor fixed on the vehicle body panel, the accelerator pedal rotary motor being connected to the accelerator pedal assembly and configured to supply rotational power to the accelerator pedal assembly when the accelerator pedal rotary motor is operated;
- a brake pedal rotary motor fixed on the vehicle body panel, the brake pedal rotary motor being connected to the brake pedal assembly and configured to supply rotational power to the brake pedal assembly when the brake pedal rotary motor is operated; and
- a protective cover fixed to the vehicle body panel and configured to cover and protect the accelerator pedal rotary motor and the brake pedal rotary motor.

17. A foldable pedal apparatus for a vehicle, the apparatus comprising:
- an accelerator pedal assembly and a brake pedal assembly that are configured to be rotatable in first and second directions,
  - wherein the accelerator pedal assembly and the brake pedal assembly are configured to be in a hidden state in which exposure thereof toward a driver is blocked when the accelerator pedal assembly and the brake pedal assembly are rotated in the first direction and inserted into respective panel grooves formed at a vehicle body panel, and
  - wherein the accelerator pedal assembly and the brake pedal assembly are configured to be in a popped-up state in which the accelerator pedal assembly and the brake pedal assembly are exposed toward the driver when the accelerator pedal assembly and the brake pedal assembly are rotated in the second direction and protrude from the respective panel grooves;
- an accelerator pedal rotary motor fixed on the vehicle body panel, the accelerator pedal rotary motor being connected to the accelerator pedal assembly and configured to supply rotational power to the accelerator pedal assembly when the accelerator pedal rotary motor is operated; and
- a brake pedal rotary motor fixed on the vehicle body panel, the brake pedal rotary motor being connected to the brake pedal assembly and configured to supply rotational power to the brake pedal assembly when the brake pedal rotary motor is operated,
- wherein pop-up angles of the accelerator pedal assembly and the brake pedal assembly are different from each other to prevent misoperation of the accelerator pedal assembly and the brake pedal assembly.

* * * * *